Figure 4:
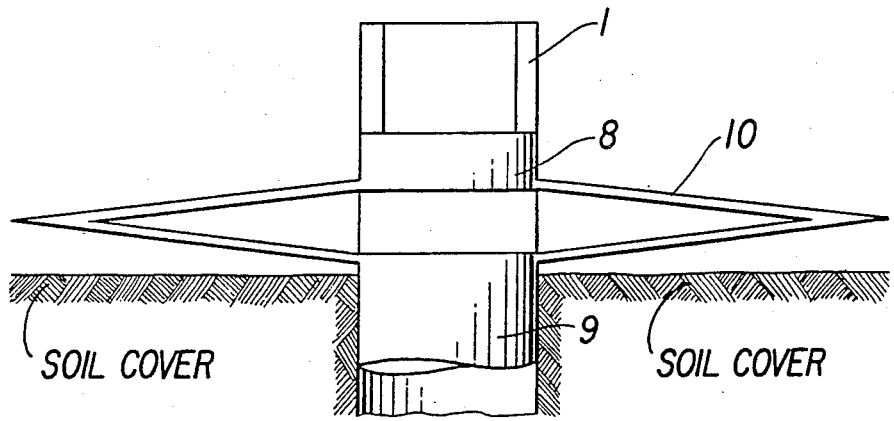

United States Patent [19]

Sandin

[11] Patent Number: 4,641,457
[45] Date of Patent: Feb. 10, 1987

[54] PLANTING SYSTEM

[76] Inventor: Nils H. Sandin, Landskronavägen 30, Dösjebro, Sweden, 240 23

[21] Appl. No.: 656,409

[22] Filed: Oct. 1, 1984

Related U.S. Application Data

[63] Continuation of Ser. No. 387,879, Jun. 3, 1982, abandoned.

[30] Foreign Application Priority Data

Oct. 30, 1980 [SE] Sweden ................... 8007634

[51] Int. Cl.⁴ .................. A01G 7/00; A01C 11/02
[52] U.S. Cl. ............................................. 47/9; 47/73; 47/77; 111/2
[58] Field of Search ..................... 47/73, 74, 77

[56] References Cited

U.S. PATENT DOCUMENTS

| 109,098 | 11/1870 | Adams | 47/32 |
|---|---|---|---|
| 790,910 | 5/1905 | McClintock | 47/48.5 X |
| 3,184,890 | 5/1965 | McKey | 47/73 |
| 3,914,900 | 10/1975 | Bigelow et al. | 47/74 |
| 3,962,822 | 6/1976 | Walters | 47/58 X |
| 4,008,544 | 2/1977 | Rupprecht et al. | 47/86 X |
| 4,031,832 | 6/1977 | Edwards | 47/77 X |
| 4,192,096 | 3/1980 | Platt et al. | 47/73 |
| 4,357,884 | 11/1982 | Rast | 47/73 |

FOREIGN PATENT DOCUMENTS

| 1482977 | 6/1969 | Fed. Rep. of Germany | 47/73 |
|---|---|---|---|
| 1032162 | 6/1953 | France | 47/30 |
| 945729 | 1/1964 | United Kingdom | 47/77 |

*Primary Examiner*—Robert E. Bagwill
*Assistant Examiner*—D. DeMille
*Attorney, Agent, or Firm*—Lowe Price Leblanc Becker & Shur

[57] ABSTRACT

A device intended to hold or contain a plant in planting comprises a sleeve having broken-through wall parts extending in the length direction of the sleeve from an upper edge of the sleeve to a lower edge. The lower edge may be formed with at least one tip to facilitate penetration of the sleeve into the soil.

When planting on soil cover, the device further comprises an anchoring device surrounding the sleeve. The device includes an upper edge part and a lower edge part which are united with each other by strips extending in the length direction and showing kerf situated in a lateral plane, preferably a central plane.

10 Claims, 4 Drawing Figures

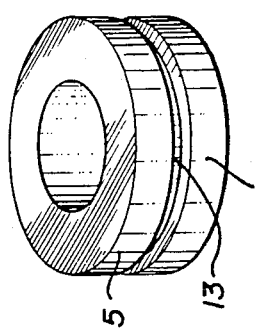
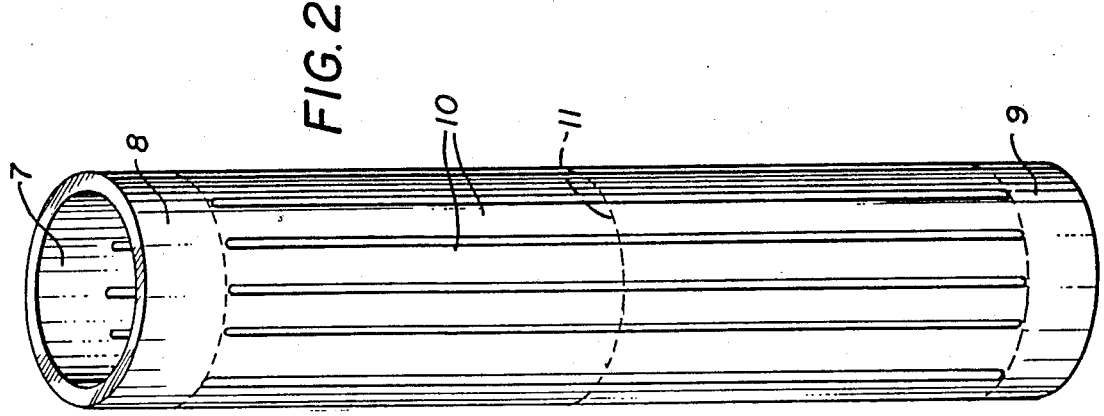
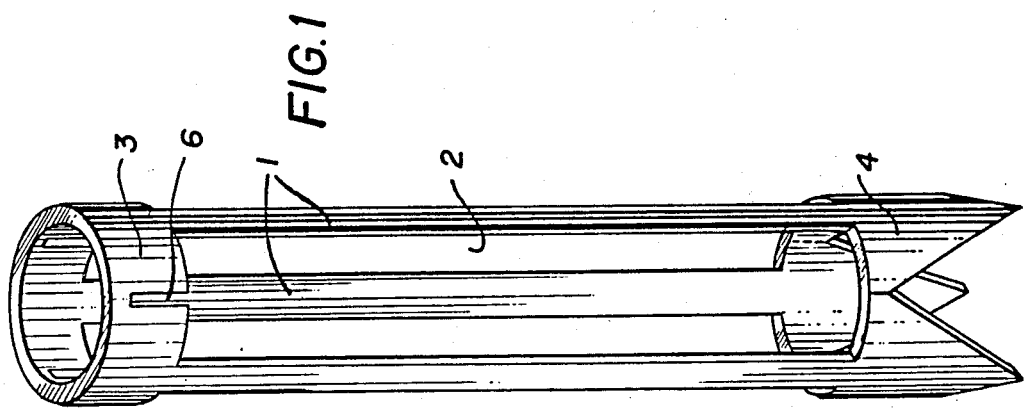

PLANTING SYSTEM

This application is a continuation of application Ser. No. 387,879, filed 6/03/82, now abandoned.

The present invention relates to a planting device, and especially to a device intended to hold or contain a plant or a vegetable being planted on foil mulches or soil covers, and to anchor the mulch or cover to the ground. Such mulches conventionally consist of plastic film or paper, the purpose of which being to partly prevent or retard the development of weeds, and partly to prevent excessive evaporation from occurring.

There is a great need for a device useful for mechanized planting of plants and vegetables. There also exists a need for a mechanized planting device with which anchoring can be achieved when planting on foil mulches.

The invention will be further explained below with reference to the accompanying drawing, which shows preferred exemplary embodiments of the device according to the invention, and in which FIG. 1 shows a planting sleeve pertaining to the device, FIG. 2 shows an anchoring device which is intended to surround the planting sleeve shown in FIG. 1 in planting on a mulch, FIG. 3 shows a squeeze means which can be applied on the upper edge part of the sleeve, and FIG. 4 shows the anchoring device with the strips buckled and folded towards each other about the kerfs to overlie and retain a soil cover on the soil.

Referring now to FIG. 1 there is shown a planting sleeve 1 forming part of the device according to the invention, having a series of circumferentially spaced elongated cutouts or broken-through wall parts 2 extending longitudinally from an upper portion or edge 3 of the sleeve and terminating at a lower edge 4 thereof. Lower edge 4 may be formed with at least one tip to facilitate easy penetration of the sleeve into the soil. Sleeve 1 is adapted to hold a plant or a vegetable, especially the roots and root medium thereof, which for example can consist of mineral wool, such as rock wool, peat and similar materials. This root medium easily absorbs water and surrounds and protects the roots from drying out. When the plant has been planted, i.e., when sleeve 1 containing the plant and root medium has been pressed down into the soil, the plant begins to grow since the roots can grow into the surrounding soil through wall cutouts 2. After a certain growth period the roots exert sufficient pressure on the solid wall parts (formed between adjacent cutouts 2) of the sleeve so that they gradually break. To facilitate this breakage, the sleeve comprises, according to a preferred embodiment, at least two complementary parts extending vertically, i.e., at least two lengthwise sections (not shown) which are secured together to form the sleeve by a squeeze means 5 fitted around upper edge 3 of the sleeve. The sleeve 1 shown in FIG. 1 has a circular cross section and in this case squeeze means 5 is a ring 5. The sleeve can also have a square or a rectangular cross section with the squeeze means 5 being correspondingly formed, and FIG. 4 shows the anchoring device with the strips buckled and folded towards each other about the kerfs to overlie and retain a soil cover on the soil.

To facilitate breakage of the sleeve after a predetermined growth period, the sleeve can be formed with fracture lines or kerfs 6 (one of which is shown in FIG. 1) extending from the upper edge of cutouts 2 into upper part 3 of the sleeve. Kerfs can also be provided in lower part 4 of the sleeve. As mentioned above, lower part 4 of the sleeve can be formed as a tip to facilitate penetration of the sleeve into the soil. To this effect, lower edge 4 can be formed with plural tips, respectively formed between two substantially V-shaped notches (FIG. 1).

From the foregoing discussion and FIG. 1, it will be apparent to those skilled in the art that as sleeve 1 is driven into ground, the ground medium initially enters the sleeve through the open bottom thereof between the tips and fills up the lower portion of the sleeve to a limited extent, pressing against the root lump within the sleeve. Thereafter, in accordance with the invention, continued penetration of the sleeve into the ground does not cause additional amounts of ground medium to enter the sleeve through the open bottom, so that the root medium remains in the sleeve and is planted. Advantageously, however, as the sleeve further penetrates the ground, the ground medium initially filling the lower end portion of the sleeve exerts force on the root medium, causing the roots to be pressed into intimate contact with the surrounding strata through the cutout.

According to a third embodiment the sleeve comprises at least two sections, which are combined by way of a band or a lip, which at least partly extends around the upper edge part 3 of the sleeve.

When planting on soil covers, such as plastic foil or paper, the device according to the invention further comprises an anchoring device 7 which extends around upper edge 3 and projects downwardly to surround sleeve 1. The main purpose of device 7 is to anchor the plastic foil or paper to the soil, however, prior to planting, the anchoring device surrounds the sleeve to protect the root lump from drying out and prevent same from growing freely out through the sleeve cutouts 2. The anchoring device 7 comprises an upper edge part 8 and a lower edge part 9 connected to each other by longitudinally extending strips 10 circumferentially spaced from each other. Strips 10 include kerfs 11 disposed in a lateral plane, preferably a common central plane, which serve to weaken the strips and effect buckling (i.e., folding) thereof when sleeve 1 is pressed downwardly through the soil cover. In this manner, each strip 10 folds against itself about kerfs 11 formed thereon and presses against the cover to anchor same to the ground.

The sleeve and anchoring device can be made from plastic or sleeve paper or a combination thereof. When planting on soil cover, it will now be appreciated that lower edge part 9 of anchoring device 7 is pressed upwards as sleeve 1 is pressed downwards into the soil so that the lower edge part 9 initiates folding of strips 10 into anchoring position against the soil cover.

In preparing the device for planting on soil cover, a plant together with the root medium is inserted into the sleeve. Sleeve 1 is then inserted into anchoring device 7 in such a way that the anchoring device surrounds the sleeve. Squeeze means 5 shown in FIG. 3 is then mounted on the upper part of sleeve 1 in such a manner that upper edge part 8 of anchoring device 7 is embraced and enclosed by depending part 12 of squeeze means 5 so that the depending part firmly retains device 7 on sleeve 1.

According to a preferred embodiment of the invention, squeeze means is provided with a circumferential groove 13, which makes it possible to move the plant from a magazine present in a planting machine to its planting mechanism. By applying a downwardly directed pressure to squeeze means 5, sleeve 1 according to the invention containing a plant is pressed down into the soil; as the sleeve is pressed into the soil, strips 10 buckle outwardly (i.e., fold against each other in a vertical plane due to kerfs 11) and are pressed against the soil cover in the manner described above.

By this means, the plant is thusly planted simultaneously as the soil cover is anchored by strips 10.

According to another preferred embodiment of the device according to the invention, the length of sleeve 1 is somewhat less than the length of anchoring device 7. The primary reason for this is as follows. In planting on soil cover, it is important that the anchoring device (i.e., lower edge part 9) first penetrate the soil cover and that thereafter the lower pointed part of sleeve 1 penetrate the soil cover to be pressed down into the soil. Otherwise, there is a tendency that only the tips of sleeve 1 will penetrate the soil cover, which makes planting substantially more difficult. Since anchoring device 7 is preferably somewhat longer than sleeve 1, fractual impressions are obtained in the soil cover along the whole cross section periphery of the anchoring device.

In manufacturing anchoring device 7, kerfs 11 are provided on the outside thereof for the sake of simplicity, and by letting the lower part of the anchoring device protrude somewhat past the lower part of the sleeve, an initial folding of the anchoring device prior to penetration of the soil cover is obtained.

The device according to the invention has the following advantages. 1. Preparation, marking and packing can be accomplished during the winter months to seasonally adjust the work-load in nurseries. 2. Complete systems can be developed from growing in nurseries to planting on the plant locality comprising inter alia special holding racks, delivery racks, etc.

3. The device is adapted for mechanized planting.

4. In planting on soil covers a planting is achieved simultaneously with anchoring of the cover.

5. Only one planting machine has to be developed which can be used for planting vegetables as well as nursery plants.

6. The device can be modified and used within many various branches.

7. The device makes a simple construction of a planting machine possible which can be made in combination with a conventional machine for laying plastic foils.

Modifications are possible within the scope of the invention. Thus, the planting sleeve itself, i.e., without the anchoring device, can have a means corresponding to the squeeze means shown in FIG. 3, applied on its upper part, said means having no squeezing effect when the sleeve is not divided into sections but serves as a carrier for the groove 13 to facilitate the use of the sleeve in a planting machine. Further, the sleeve can hold or contain a prestage of a plant, such as a cutting or simply a seed with a growing medium. Other modifications are obvious to one skilled in the art.

I claim:

1. A device used to contain a plant for planting in soil, comprising a sleeve having a wall formed with cutouts extending in the longitudinal direction of the sleeve between a circumferentially extending upper part and a lower end integrally formed with the wall of the sleeve, the lower end being formed open to facilitate penetration of the sleeve into the soil, said sleeve being sufficiently rigid so as to be driven substantially completely into the soil without breaking; and further comprising an anchoring device including an upper edge part and a lower edge part connected together by plural strips extending in the longitudinal direction, said strips having plural kerfs formed in a plane lying transverse to the strips, said anchoring device adapted to surround the sleeve so that the lower edge part of the anchoring device during planting is pressed upwards as a force is applied to press the sleeve downwards into the soil, and the lower edge part causing the strips to buckle and fold toward each other about the kerfs so that the folded strips overlie a soil cover and thereby retain the cover on the soil.

2. The device of claim 1, wherein said lower end is formed with at least one tip.

3. The device of claim 1, wherein said sleeve is cylindrical, said lower end having the same outer diameter as the remainder of the sleeve.

4. A device used to anchor a soil cover layer, comprising a sleeve having a wall with cutouts, said cutouts extending in the longitudinal direction of the sleeve between a circumferentially extending upper part and a lower part, said wall parts being integrally formed with the wall of the sleeve, the lower part being formed with tips to facilitate penetration of the sleeve into the soil, said sleeve being sufficiently rigid so as to be driven substantially completely into the soil without breaking; and further comprising an anchoring device including an upper edge part and a lower edge part, said upper and lower edge parts being connected together by plural strips extending in the longitudinal direction, said strips having plural kerfs formed in a plane lying transverse to the strips; and means for connecting an upper edge part of the sleeve to an upper edge part of the anchoring device so that as a force is applied to said connecting means to press the sleeve downwards into the soil, the lower edge part of the anchoring device causes the strips to buckle and fold toward each other about the kerfs so that the folded strips overlie a soil cover and thereby retain the cover on the soil.

5. A device according to claim 4, wherein the sleeve and anchoring device each have a circular cross section.

6. A device according to claim 4 or 5, wherein the length of the sleeve is less than the length of the anchoring device.

7. The device of claim 4, wherein the upper edge and lower edge parts of the anchoring device are formed integrally with the strips.

8. The device of claim 4, wherein the kerfs extend in a central plane transverse to the strips.

9. The device of claim 4, further including an annular retaining means connecting the sleeve and anchoring device together, said retaining means being mounted to engage the upper edge part of the sleeve and having a depending part embracing the upper edge part of the anchoring device to retain same on the sleeve.

10. Apparatus for anchoring a soil cover layer into a soil medium and extending through a soil cover, comprising, in combination:

(a) a rigid sleeve means being hollow in the center thereof for said penetration, said sleeve means including downwardly directed tips extending from a lower edge part thereof to facilitate penetration of the above sleeve means into the soil;

(b) a compressible anchoring device surrounding the sleeve means, including an upper edge part and a lower edge part connected to together by plural longitudinal strips, said strips containing kerfs; and (c) means for connecting an upper edge part of the sleeve to the upper edge part of the anchoring device, said connecting means being mounted to simultaneously engage the rigid sleeve upper edge part and the compressible anchoring device upper edge part to retain said upper edge parts adjacent each other, whereby when a downwardly directed external force is applied to the connecting means to drive the sleeve into the soil, said downward force simultaneously is transmitted to the rigid sleeve and to the compressible anchoring device by the connecting means so that the lower edge part of the anchoring device pressing against the ground generates an upwardly directed force while the sleeve is driven into the soil, causing the anchoring strips to buckle about the kerfs and fold against each other to press against and thereby retain the soil cover on the ground.

* * * * *